(12) United States Patent
Ahmed et al.

(10) Patent No.: US 12,174,801 B2
(45) Date of Patent: Dec. 24, 2024

(54) INFORMATION RETRIEVAL FRAMEWORK

(71) Applicant: SAP SE, Walldorf (DE)

(72) Inventors: Naved Ahmed, Bangalore (IN); Saritha Palli, Bangalore (IN); Shweta Sureshchandra Gupta, Bangalore (IN)

(73) Assignee: SAP SE, Walldorf (DE)

( * ) Notice: Subject to any disclaimer, the term of this patent is extended or adjusted under 35 U.S.C. 154(b) by 317 days.

(21) Appl. No.: 17/507,700

(22) Filed: Oct. 21, 2021

(65) Prior Publication Data

US 2023/0128661 A1  Apr. 27, 2023

(51) Int. Cl.
*G06F 16/21* (2019.01)
*G06F 16/245* (2019.01)

(52) U.S. Cl.
CPC .......... *G06F 16/212* (2019.01); *G06F 16/245* (2019.01)

(58) Field of Classification Search
CPC .............................. G06F 16/212; G06F 16/245
See application file for complete search history.

(56) References Cited

U.S. PATENT DOCUMENTS

| | | | | |
|---|---|---|---|---|
| 2004/0181440 A1* | 9/2004 | Yeh | ................. | G06F 16/288 703/2 |
| 2008/0120270 A1* | 5/2008 | Lamberts | ............ | G06F 16/2477 |
| 2008/0195643 A1* | 8/2008 | Sheth-Voss | ........... | G06F 16/252 |
| 2009/0323662 A1* | 12/2009 | Chen | ..................... | H04W 72/30 370/343 |
| 2010/0281458 A1* | 11/2010 | Paladino | ................... | G06F 8/71 717/136 |
| 2014/0149093 A1* | 5/2014 | Amulu | ............... | G06Q 30/0201 703/6 |
| 2014/0181154 A1* | 6/2014 | Amulu | .................... | G06F 16/28 707/803 |
| 2016/0253404 A1* | 9/2016 | Fabijancic | .............. | G06F 16/21 707/625 |
| 2017/0220606 A1* | 8/2017 | Wang | ....................... | G06N 5/04 |
| 2017/0270163 A1* | 9/2017 | Christoph | ........... | G06F 16/2455 |
| 2017/0308568 A1* | 10/2017 | Laethem | .................. | G06F 8/65 |
| 2019/0197137 A1* | 6/2019 | Braud | .................... | G06F 16/248 |
| 2019/0278862 A1* | 9/2019 | Kapoor | ............... | G06F 16/2282 |
| 2019/0340287 A1* | 11/2019 | Tamjidi | ................. | G06F 16/242 |
| 2020/0250077 A1* | 8/2020 | Bregman | ............ | G06F 11/3676 |
| 2021/0034614 A1* | 2/2021 | Kothari | .............. | G06F 16/2264 |
| 2021/0117437 A1* | 4/2021 | Gibson | ................ | G06F 16/258 |
| 2021/0318998 A1* | 10/2021 | Filip | .................... | G06F 16/245 |
| 2023/0128661 A1* | 4/2023 | Ahmed | ................ | G06F 16/245 707/769 |

* cited by examiner

*Primary Examiner* — Alicia M Willoughby
(74) *Attorney, Agent, or Firm* — Klarquist Sparkman, LLP

(57) ABSTRACT

Systems and processes for managing an information retrieval database are provided. In a method for modeling a data object storing table relationships for tables belonging to a computer application, a first set of table links are retrieved from the data object and an enhanced set of table links are generated by appending additional table links to the first set based on linkages within the tables and/or code extensions/add-ins. A first set of field links are generated for the data object by matching metadata of the enhanced set of table links, and an enhanced set of field links are generated by performing additions, deletions, or replacements within the first set based on characteristics of the field links in the first set and/or code extensions/add-ins. A model for the data object is generated, representing the enhanced set of table links and the enhanced set of field links, and stored in a database.

18 Claims, 8 Drawing Sheets

IRF MODELING

SHOW ADDITIONAL MODELING OPTIONS [i]

GENERATE MODEL / MODEL DETAILS

ILM OBJECT  BC_SFLIGHT  [🔍][↗]   SIMULATE   GENERATE

☐ ACCEPT DELETIONS OF EXISTING MODEL RELATIONSHIPS   ☐ INCLUDE MODELING CODE

TABLE RELATIONSHIPS

| ILM OBJECT | FROM TABLE | TO TABLE | ACTION |
|---|---|---|---|
| BC_SFLIGHT | SNVOICE | SCUSTOM | ADD |
| BC_SFLIGHT | SNVOICE | STICKET | ADD |
| BC_SFLIGHT | STICKET | SBOOK | ADD |
| BC_SFLIGHT | STICKET | SCARR | ADD |
| BC_SFLIGHT | STICKET | SCUSTOM | ADD |
| BC_SFLIGHT | STICKET | SFLIGHT | ADD |
| BC_SFLIGHT | SFLIGHT | SAPLANE | ADD |
| BC_SFLIGHT | SPFLI | SFLIGHT | ADD |

FIELD LINKS

| ILM OBJECT | FROM TABLE | FROM FIELD | TO TABLE | TO FIELD | LINK TYPE | LINK VALUE | ACTION |
|---|---|---|---|---|---|---|---|
| BC_SFLIGHT | SCUSTOM | ID | SNVOICE | CUSTOMID | REF | | ADD |
| BC_SFLIGHT | SFLIGHT | PLANETYPE | SAPLANE | PLANETYPE | REF | | ADD |
| BC_SFLIGHT | SPFLI | CARRID | SFLIGHT | CARRID | REF | | ADD |
| BC_SFLIGHT | SPFLI | CONNID | SFLIGHT | CONNID | REF | | ADD |
| BC_SFLIGHT | STICKET | BOOKID | SBOOK | BOOKID | REF | | ADD |
| BC_SFLIGHT | SFLIGHT | BOOKID | SBOOK | CARRID | REF | | ADD |
| BC_SFLIGHT | SFLIGHT | BOOKID | SBOOK | CONNID | REF | | ADD |
| BC_SFLIGHT | STICKET | BOOKID | SBOOK | FLDATE | REF | | ADD |

INFORMATION RETRIEVAL FRAMEWORK

BACKGROUND

Organizations that collect personal data from individuals are typically subject to regulations or rules regarding protection and accessibility to the data. For example, the General Data Protection Regulation (GDPR) includes provisions and requirements for data controllers (e.g., the natural or legal person, public authority, agency or other body which, alone or jointly with others, determines the purposes and means of the processing of personal data, as defined in Article 4 of the GDPR). The provisions and requirements of the GDPR include protecting the rights of data subjects that correspond to collected personal data (e.g., by following principals in Article 5 of the GDPR, which may include pseudonymization of the data or other practices) and providing personal data of a particular individual to that individual if requested (e.g., in accordance with the provisions in Articles 12 and 15 of the GDPR, which includes the provision that the controller shall take appropriate measures to provide information and communication relating to processing to the data subject in a concise, transparent, intelligible, and easily accessible form). As the personal data managed by a data controller may be distributed in many different areas of one or more databases, it may be difficult to efficiently identify and provide an individual's personal data to the individual while maintaining security and privacy of other data collected by the data controller. Accordingly, there remains a need for improved technologies to manage personal data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the detailed description is directed to various innovative technologies for managing, processing, and generating display information relating to data input into cartesian columns. In some examples, the disclosed technologies can be implemented as computer-readable media storing instructions which, when executed by one or more hardware processors, cause the hardware processors to perform the following actions. A selection of a data object is retrieved, the data object storing table relationships for tables belonging to a computer application. A first set of table links is retrieved from the data object, and an enhanced set of table links is generated by appending additional table links to the first set based on linkages within the tables. A first set of field links are generated for the data object by matching metadata of the enhanced set of table links, and an enhanced set of field links are generated by performing additions, deletions, or replacements within the first set of field links based on characteristics of the field links in the first set. A model is generated for the data object representing the enhanced set of table links and the enhanced set of field links, and a database for an information retrieval framework is populated with the generated model, the database storing a plurality of models for a plurality of data objects.

In some examples, the disclosed technologies can be implemented as a method performed by a computer. A selection of a data object comprising table links for a plurality of database tables belonging to a computer application is received, via user input to a user interface, and linkages within the database tables for the data object are extracted and an enhanced set of table links are generated by appending additional table links to the table links of the data object based on the extracted linkages. Metadata of tables in the enhanced set of table links is extracted and matched to determine a first set of field links for the data object, and an enhanced set of field links is generated by adjusting field links in the first set of field links based on characteristics of the field links in the first set. A model for the data object representing the enhanced set of table links and the enhanced set of field links is generated, and a representation of the generated model is outputted to the user interface. A database for an information retrieval framework is populated with the generated model, the database storing a plurality of models for a plurality of data objects, each model of the plurality of models defining a boundary for a respective associated data object of the plurality of data objects.

In some examples, the disclosed technologies can be implemented in a system including one or more hardware processors with coupled memory, and computer-readable media storing instructions executable by the one or more hardware processors. The instructions include first and second instructions. The first instructions, when executed, cause a request for personal data associated with a data subject to be received. The second instructions, when executed, cause the personal data in a database of an information retrieval framework to be located and a report to be outputted indicating the personal data, wherein the database stores a plurality of models for a plurality of data objects, each model of the plurality of models defining a boundary for a respective associated data object of the plurality of data objects. Each model of the plurality of models is generated for the respective data object of the plurality of data objects by extracting linkages within the database tables for the data object and generating an enhanced set of table links by appending additional table links to the table links of the data object based on the extracted linkages, extracting and matching metadata of tables in the enhanced set of table links to determine a first set of field links for the data object, generating an enhanced set of field links by adjusting field links in the first set of field links based on characteristics of the field links in the first set, and generating the model for the data object representing the enhanced set of table links and the enhanced set of field links.

The foregoing and other objects, features, and advantages of the invention will become more apparent from the following detailed description, which proceeds with reference to the accompanying figures.

DETAILED DESCRIPTION

Introduction and Overview

Figure 1:
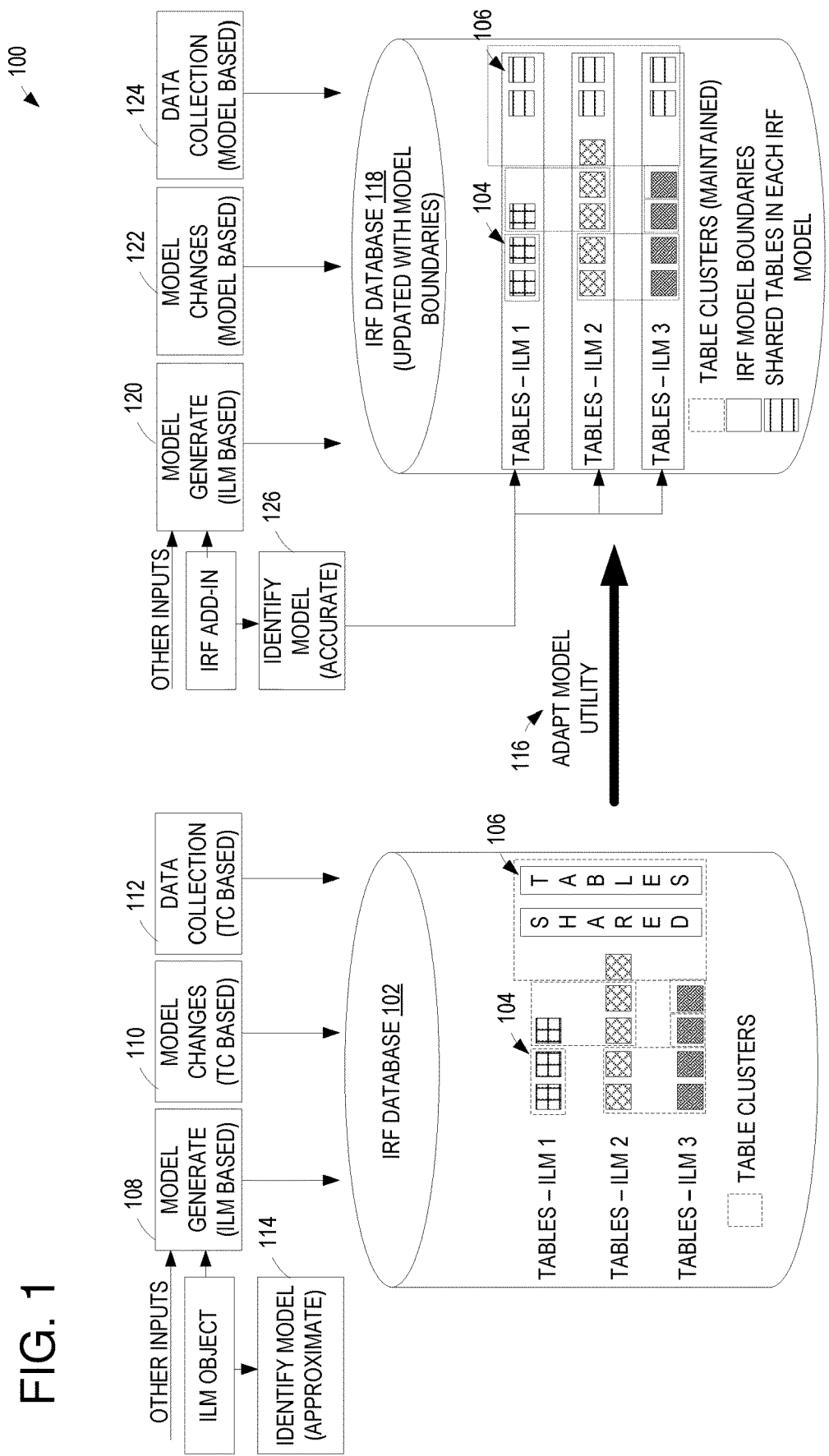
FIG. 1 is a block diagram of an example adaptation of an information retrieval framework database to model data in accordance with examples of the present disclosure.

As described above, organizations may provide mechanisms, such as a retrieval function, for retrieving and informing data subjects about personal data stored by the organizations. Such operations may be performed accordance with regulations and rules governing the storage of such personal data. In some examples, an information retrieval framework (IRF) may be used, which includes one or more databases for storing personal data and mechanisms for identifying a data subject and retrieving personal data relating to the data subject. In some of these examples, the framework enables personal data retrieval by generating an application data model using information lifecycle management (ILM) objects (e.g., mapped to archiving or destruction objects) having table links. These data models are delivered to customers as database entries, and the customers can import these entries and generate their own models in their namespace, followed with manual adjustments.

However, delivering IRF models to customers may cause multiple issues that increase the framework's complexity, reduce efficiency, and potentially decrease accuracy in personal data retrieval. Some examples of issues that may relate in the above-described approach includes a lack of model identification (e.g., saving a model in a database merges it with other models as boundaries are not maintained). For example, in older systems, model generation is ILM-based, while model changes and data collection are based on table clusters. This inconsistency leads to a lack of accuracy in modeling, and a lack of boundary consistency in the models (described in more detail below with respect to FIG. 1). Additional issues include a reliance upon manual adjustments (e.g., which may be error prone and which decrease efficiency of the framework), a lack of scalability (e.g., multiple links may be generated with no provision to replace or delete them, resulting in additional manual corrections), a lack of unified concepts for links (e.g., complexity in linking to models), computational resource intensity (e.g., since database entries cannot be reused, applications repeat modeling for each release, resulting in a large workload to perform the modeling), a redundancy and inconsistency of models (e.g., due to landscape complexity and overlapping/cross-client model entries, uncontrolled adjustments, and merging of models), a lack of ability to correct or generate new models without upgrading (and a disruption to existing models when upgrades are performed), and a lack of ability to change models until a model is generated (e.g., a lack of simulation capabilities).

This disclosure describes a new approach to an information retrieval framework (IRF) controlled by a data management entity, which includes providing data models for the stored data (e.g., retrievable personal data) as code, rather than database entries. For example, a business add-in or other type of coding or code extensions may be used as extension points on which the data management entity as well as a user/customer of the IRF may extend standard behavior. In this way, the data management entity may deliver its version of models and the user/customer may extend functionality of the framework using their own version of the coding. The disclosed technologies include generating a model for each information lifecycle management (ILM) object. The model may be a representation of table links and field links corresponding to personal data. The model may include a list of table hierarchies and may define how the tables in the hierarchy are joined by different types of links. The model may also establish boundaries for each ILM object (model), which may help to improve accuracy in associating personal data with corresponding data subjects. The above and additional details relating to the disclosed technologies are described further below.

Example System

FIG. 1 shows an example block diagram of a system 100 for generating ILM models in an IRF database using an adapt model utility in accordance with examples of the present disclosure. As described above, the IRF database may store personal data corresponding to one or more data subjects to enable the personal data to be retrieved responsive to a request from a data subject.

An original state of an IRF database 102 is shown storing ILM tables 104 and shared tables 106 relating to a plurality of ILM objects (e.g., ILM1, ILM2, ILM3) in a boundaryless manner. A model generation process 108 for the IRF database 102 is ILM based and takes in ILM objects and other inputs (e.g., dependencies from underlying archiving or destruction objects, tables referred to from a current set of tables, manual changes to the model in a regeneration scenario, etc.) to generate the models represented in the database. Model changes 110 and data collection 112 are based on table clusters. For example, the tables may be clustered corresponding to associations between the tables (e.g., representing by the table clusters shown in dashed lines), however, the ILM objects themselves are boundaryless. Accordingly, while model changes and data collection (e.g., to service requests for personal data) may take into account the relationships of the tables represented by the clusters, the integrity of the ILM object itself is not maintained, which can lead to the dispersal of personal data relating to a data subject represented in a first ILM object being exposed to a data subject represented in a second ILM object that includes tables clustered with tables of the first ILM object. In this way, a model identification process 114 for the IRF database 102 is approximate.

In order to address these and the other issues outlined above, an adapt model utility 116 may be executed to migrate the IRF database 102 into an updated IRF database 118 that provides IRF model boundaries around each ILM object (represented by associated tables for that ILM object). For example, the same ILM object tables 104 and shared tables 106 are represented in updated IRF database 118 as in original IRF database 102. However, the shared tables are broken out into individual tables replicated for each ILM object, and boundaries are established around the tables for each ILM object. To maintain backward compatibility, the table clusters are also maintained in the updated IRF database 118. Similarly to the IRF database 102, a model generation process 120 for the updated IRF database 118 is ILM based. However, the model generation process 120 takes in an IRF add-in or code extension(s) (representing an ILM object, as described above) and other inputs to generate the model, rather than taking in the ILM object itself. Since the ILM object is represented by code, this allows a model changes process 122 and a data collection process 124 for the updated IRF database 118 to be model based with model boundaries (e.g., around each ILM object, as represented by the solid line borders in the updated IRF database 118 shown in FIG. 1), rather than being table cluster based, as for the original IRF database 102. Accordingly, a model identification process 126 is more accurate for the updated IRF database 118 than the original IRF database 102.

First Example Method—Model Adaptation

Figure 2:
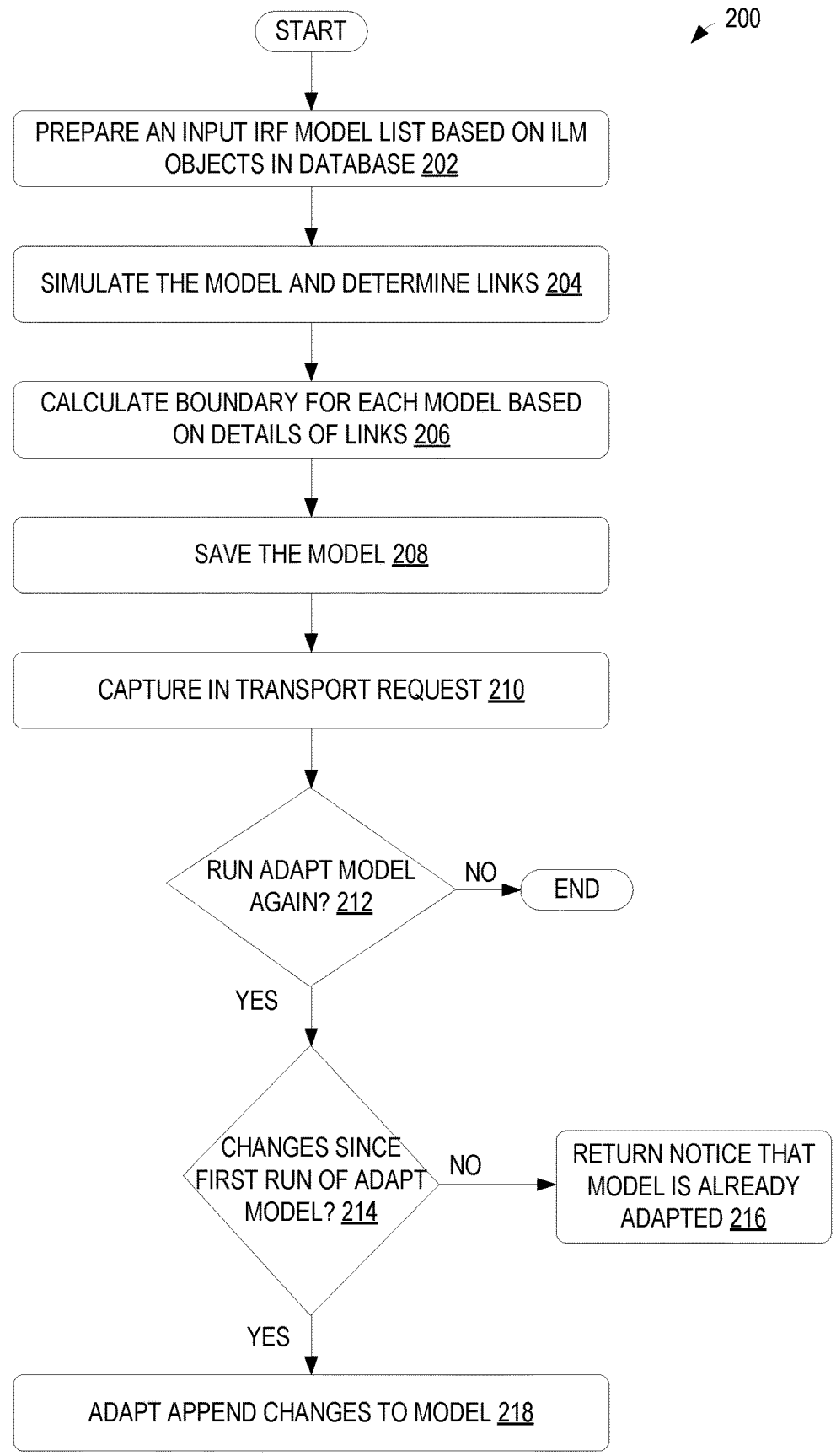
FIG. 2 is a flowchart of an example method for adapting an information retrieval framework database to model data.

FIG. 2 is a flowchart of an example method 200 for illustrating a process sequence of performing the adapt model utility operation 116 of FIG. 1 to migrate an IRF database to an updated IRF database that has model boundaries. For example, method 200 may be performed by one or more components of a system, such as a computing system implementing the IRF. At 202, the method includes preparing an input IRF model list based on ILM objects in an IRF database.

At 204, the method includes simulating the model and determining links associated with the ILM objects. At 206, the method includes calculating a boundary for each model based on the details of the links. For example, the boundary for the models may identify tables corresponding to the same ILM object.

At 208, the method includes saving the model. For example, the model may be stored in a storage device local to and/or in communication with the computing system performing method 200. At 210, the method includes capturing a transport request to implement the model as code (e.g., as a business add-in and/or code extension). For example, the request may trigger the performance of a model code generation, described in more detail below with respect to FIGS. 3 and 4.

At 212, the method includes determining if the adapt model utility is to be run again. If not (e.g., "NO" at 212), the method ends. If the utility is to be run again, the method includes determining if there are any changes since the first run of the adapt model utility, as indicated at 214. If there are no changes since the first run (e.g., "NO" at 214), the method includes outputting a notice that the model is already adapted, in order to avoid expending computing resources on already adapted models. If there are changes since the first run (e.g., "YES" at 214), the method includes adapting the appended changes to the model, as indicated at 218. For example, performing the adaptation on only the changes to the model may conserve computing resources.

Second Example Method—Model Code Generation

Figure 3:
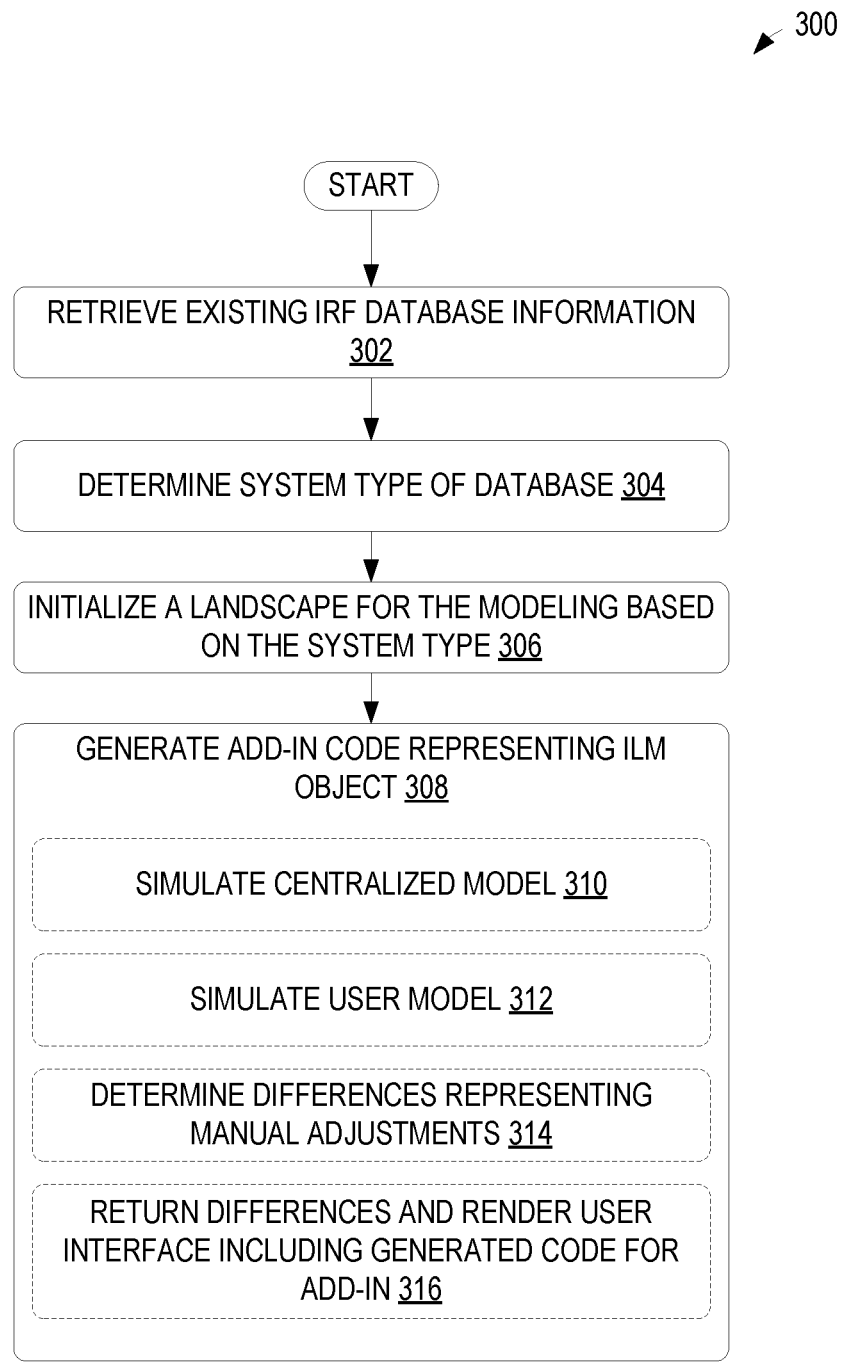
FIG. 3 is a flowchart of an example method for generating code for existing data in accordance with examples of the present disclosure.

FIG. 3 is a flowchart of an example method 300 for illustrating a process sequence of generating model code for use in an IRF database model. For example, method 300 may be performed by one or more components of a system, such as a computing system implementing the IRF. At 302, the method includes retrieving existing IRF database information. For example, the existing IRF database information may include information of the data stored in the database, a configuration of the database, and/or other information relating to the database.

At 304, the method includes determining a system type of the database. At 306, the method includes initializing a landscape for modeling based on the system type. Example landscapes that may be initialized for associated system types include: a landscape for which a customer is represented as IRF, which may be used for customer on-premise system types, a landscape for which a cloud is represented as IRF, which may be used for cloud system types, and a landscape for which an internal/managing service is represented as IRF, which may be used for internal/managing on-premise system types.

At 308, the method includes generating respective add-in code representing each ILM object in the IRF database. In order to generate the code, the method may include simulating a centralized model, as indicated at 310, and simulating a user model, as indicated at 312. For example, as described above, the add-in code may have base behaviors/sub-routines/etc. defined by the data management system and/or the computing system managing the IRF, and may also be extensible by the user/customer of the IRF. Accordingly, the centralized model may correspond to the base add-in features, while the user model incorporates the extensions provided by the user.

As indicated at 314, the method may include determining differences representing manual adjustments in the model. The method may further include returning the differences and rendering a user interface including generated code for the add-in, as indicated at 316.

Third Example Method—Model Generation

Figure 4:
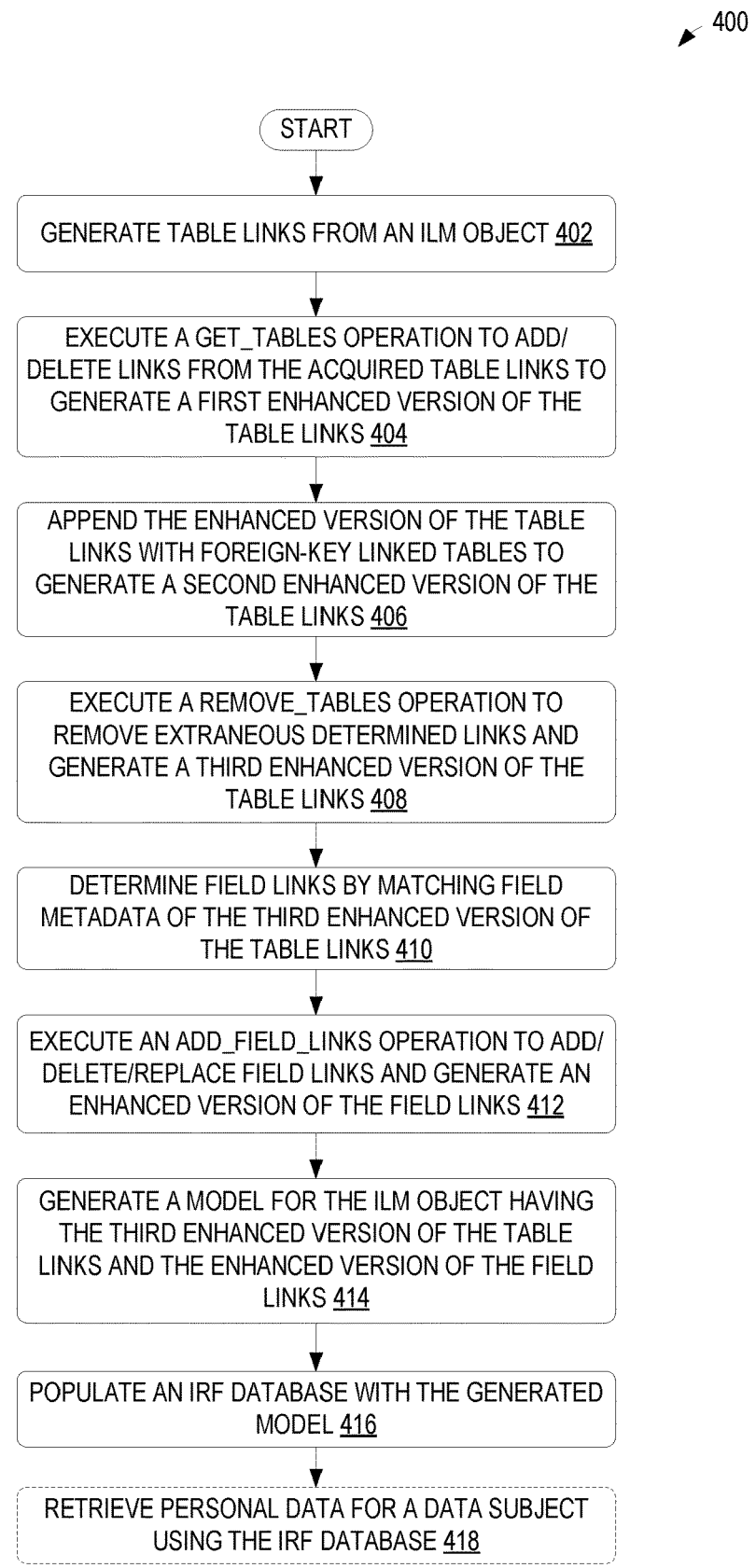
FIG. 4 is a flowchart of an example method for generating a model for a database object in accordance with examples of the present disclosure.

FIG. 4 is a flowchart of an example method 400 for illustrating a process sequence of generating a model for use in an IRF database model. For example, method 400 may be performed by one or more components of a system, such as a computing system implementing the IRF. At 402, the method includes generating table links from an ILM object (e.g., a wrapper over an archiving object or destruction object, which includes a container of table relationships/hierarchies belonging to an application).

At 404, the method includes executing an operation (e.g., a GET_TABLES operation) for adding and deleting table links to/from the acquired links to generate a first enhanced version of the table links. For example, the GET_TABLES operation may include a code extension and/or add-in implemented/configured by the management system and/or a user/customer. In some examples, if both management system and user/customer implementations of the add-in are executed and a conflict arises, the customer implementation may be given priority. The code extension/add-in includes details on which table links are to be added and/or deleted. In some examples, application developers may also manually add and/or delete table links via a user interface and deliver such changes as database entries. The links are further enhanced by appending the first enhanced version of the table links with foreign key linked tables to generate a second enhanced version of the table links, as indicated at 406. For example, the tables of the ILM object may have other tables linked inside with a foreign key relationship (e.g., a sales table may have an address number, where the address numbers are internally linked to address tables), so such tables are appended to the enhanced links from operation 404. At 408, the method includes executing an operation (e.g., a REMOVE_TABLES operation) to remove any extraneous determined links (e.g., links to redundant tables or tables irrelevant to the use case, such as personal data) to generate a third enhanced version of the table links.

At 410, the method includes determining field links by matching field metadata of the third enhanced version of the table links. At 412, the method includes executing an operation (e.g., an ADD_FIELD_LINKS operation) to add, delete, and/or replace field links in the list generated at 410 in order to generate an enhanced version of the field links. For example, if there are two fields with a same name and/or of a same type, the system may determine that the fields should be joined. The ADD_FIELD_LINKS operation may include a code extension and/or add-in configured by the management system and/or user/customer. In some examples, if both management system and user/customer implementations of the add-in are executed and a conflict arises, the customer implementation may be given priority. The code extension/add-in includes details on which field links are to be added and/or deleted. In some examples, application developers may also manually add and/or delete field links via a user interface and deliver such changes as database entries.

At 414, the method includes generating a model for the ILM object, the model representing the third enhanced version of the table links (generated at 408) and the enhanced version of the field links (generated at 412). For example, the model generated at 414 may correspond to the boundary models depicted for IRF database 118 of FIG. 1. At 416, the method includes populating an IRF database with the generated model. For example, the generated model may correspond to one of the ILM objects modeled in the IRF database 118 of FIG. 1. At 418, the method optionally includes retrieving personal data for a data subject using the IRF database. For example, as described above, the disclosed technologies may be used to service requests for personal data stored/managed by one or more applications of a system. The IRF database referenced at 416 may be used to store this personal data via the boundary-modeled ILM objects, thereby facilitating the retrieval of the personal data.

Example User Interface

Figure 5:
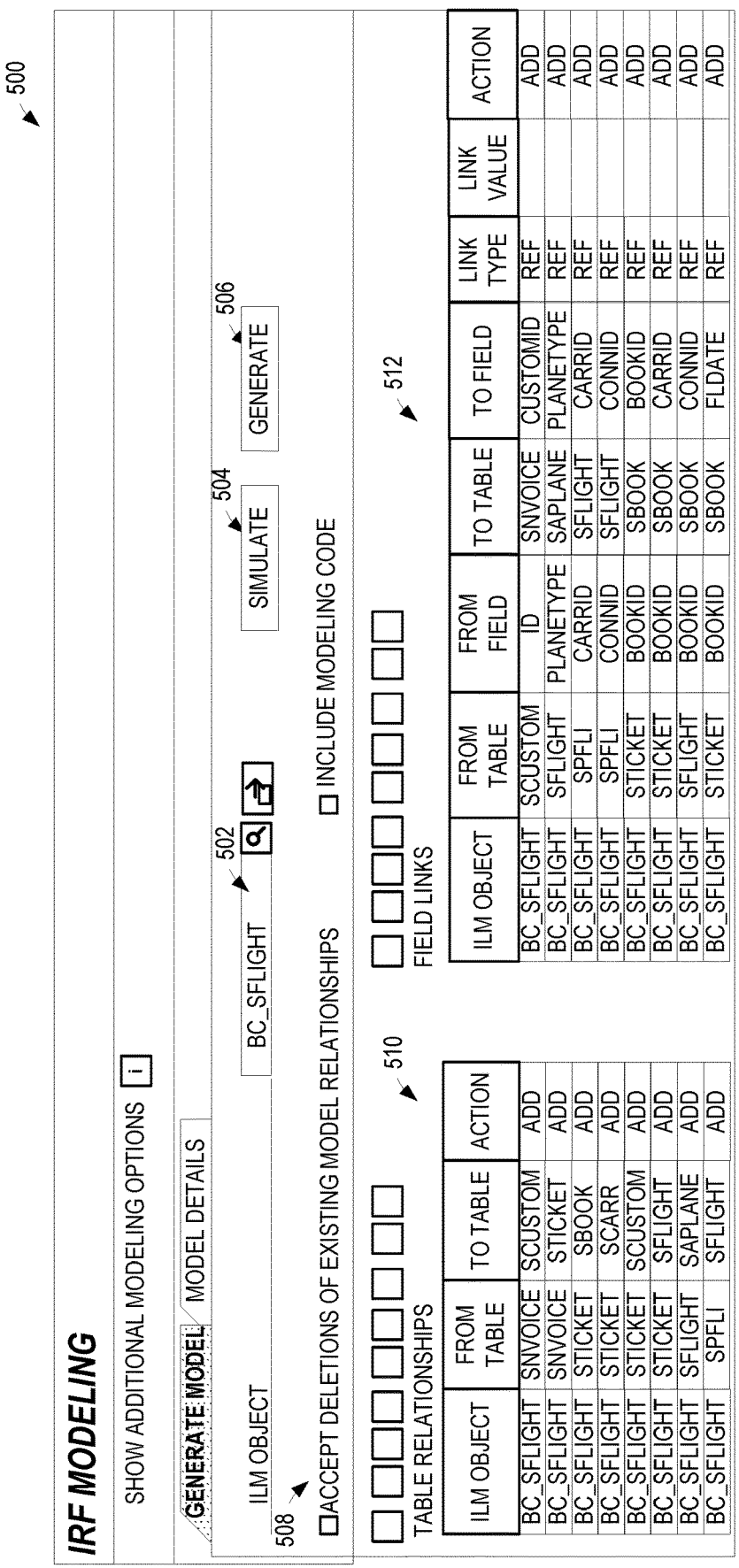
FIGS. 5 and 6 show examples user interfaces for generating a model of a database object in accordance with examples of the present disclosure

FIG. 5 shows example user interface 500 for creating/generating or simulating an IRF model in accordance with the technologies described herein. For example, the user interface 500 may be used during the execution of method 400 of FIG. 4. User interface 500 includes an object field 502 for specifying an ILM object for which an IRF model is requested to be generated or simulated. For example, the ILM object may be selected from a list of ILM objects in an IRF database and/or otherwise entered by a user. A simulation may provide a result of modeling an ILM object without publishing the model to the IRF database, whereas a generation may alter the IRF database to include the model for the ILM object. User interface 500 further includes selectable interface elements including a simulation selector 504 and a generate selector 506, for initiating the simulation or generation, respectively. User interface 500 also includes selectable options 508 for defining parameters of the model generation or simulation, including operations to accept deletions of existing model relationships and to include modeling code (e.g., business add-in code) in the output. User interface 500 further shows an example output of a model simulation, including a list of table relationships 510 and a list of field links 512 for the ILM object specified in object field 502 of user interface 500a. For example, the table relationships 510 may correspond to the third enhanced version of the table links generated at 408 and the field links 512 may correspond to the enhanced version of the field links generated at 412 of method 400 shown in FIG. 4.

Figure 6:
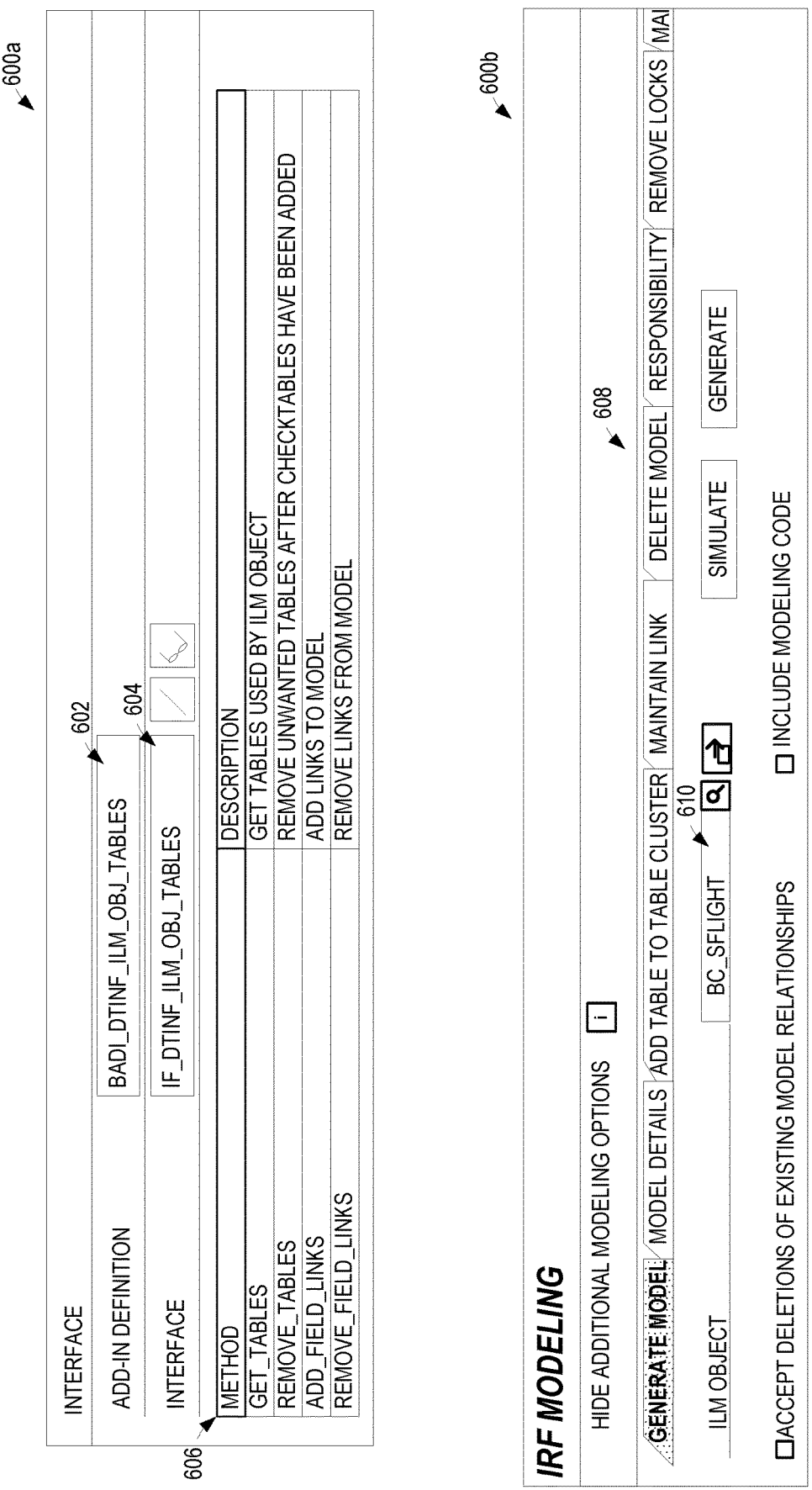

FIG. 6 shows example user interfaces 600a and 600b for performing adjustments to a generated model. User interface 600a shows an example interface for defining code to provide adjustments, and user interface 600b shows an example interface for performing a transaction to provide adjustments. In user interface 600a, a code definition field 602 and associated interface field 604 accept input to allow a user to select a code and interface for performing adjustments, and an output 606 shows the operations defined by the selected code to perform adjustments to a model. In user interface 600b, selectable tabs 608 are included to allow a user to perform corresponding adjustments to a model for an object specified in object field 610. For example, the user may utilize interface 600b to add a table to a table cluster, maintain a link, delete a model, and/or perform other adjustments to a generated model via corresponding transactions.

Further Implementation Examples

As described above, the modeling of ILM objects to populate an IRF database in accordance with the technologies described herein may be used to service requests for personal data corresponding to a data subject. For example, data subjects may request information on their personal data stored in a targeted system(s) across all applications of the system(s). The request may be received via a corresponding channel (e.g., email, phone call, written request, etc.) and provided to a data protection officer associated with the system(s). The data protection officer may prepare information for inclusion in a report using the IRF described herein (e.g., the report may be in a readable format such as a PDF, TEXT, XML, JSON, etc. file). The report may be provided to the data subject via an associated channel (e.g., email, print, etc.).

In order to generate the report, the data protection officer may interact with a user interface associated with the IRF to identify the data subject (e.g., perform a dynamic search based on a selected data subject type [e.g., business partner, customer, vender, user, etc.], data subject ID [e.g., address information, name information, other search terms], and/or other parameters). The data protection office may also specify (e.g., via the user interface for the IRF) other parameters, such as a use language for the data subject, types of data to be collected, authorized purposes for the data, filters for the data, and/or configurable settings for collection, display, and/or download of the data. The retrieved data may include data in the IRF corresponding to the data subject, which is identified based on the modeled ILM objects that are modeled as described herein. The modeling described herein captures all scenarios in a same namespace, thereby simplifying the data request by reducing the number of databases targeted by the search (e.g., in other systems, redundant models are stored in different databases, such as a cloud database, on-premise database, and customer/user database; each of these are replaced with a centralized IRF database according to the disclosed technologies).

Example Advantages

This solution is superior in comparison of approaches in the past with regards to at least the following considerations. Migrating models to boundary-based behavior uniquely identifies the models, enabling the deletion of the models and other operations to be performed on the models. Such migration, which includes converting application models to code (e.g., business add-ins) also allows for backward compatibility with low-effort, reducing complexity and errors in model generation/adjustments. Representing models as code also provides the following advantages: models can be iteratively adjusted (regenerated) using add-in corrections, and can be deleted within boundaries, manual adjustment of field links may be replaced (e.g., with the implementation of the ADD_FIELD_LINKS operation defined by the code), modeling may be simplified using a unified concept of link types (and values), where, for common links across models, a resolution sequence for the link conflict is defined as: FM (function model) ->Final ->Constant ->Reference, models can be transported across systems and releases, model variations across releases are handled using minimalistic modeling, providing robustness by having a common core model across releases and ignoring the variations (non-existing entities) during processing, models can be generated in 1 namespace (as there are no database entries to store/deliver), which simplifies a landscape of the modeling, hassles with database entries inconsistencies are removed as database entries are no longer used, and the models can be delivered as notes for corrections/new models, allowing users to implement and regenerate models seamlessly.

Additionally, the model adaption utility described herein is developed to adapt existing models to a common boundary-based behavior, enabling delete model, etc., simplifying landscape, and preventing incorrect model-merging leading to non-compliant data retrieval. The technologies described herein result in a significant reduction in application implementation/delivery/maintenance effort. One landscape/one consumer simplifies effort for the IRF tool team, and the code-based modeling, which encapsulates adjustments enables seamless delivery (new/corrections) to customers using standard notes implementation to reduce effort for users. The models generated according to the disclosed technologies are easy to consume, easy to maintain/upgrade, easy to test, and easy to deploy to production. Safeguard investments may include non-disruption of customer models with provision to consume/ignore (default) models provided by the data management system.

Models as add-ins/code may be reused across enterprise resource planning suites and their releases, ignoring variations in underlying systems. For example, an application may have many ILM objects with shared links that can be pushed into a common module. A common module may also have complex application logic. This can be consumed across modeling add-ins/code. For example, applications using a first type of framework can now derive links from their first type of framework objects and reuse same logic for several ILM objects. The described technologies also provide intuitive simulation of models and user extensibility, as described above.

A Generalized Computer Environment

Figure 7:
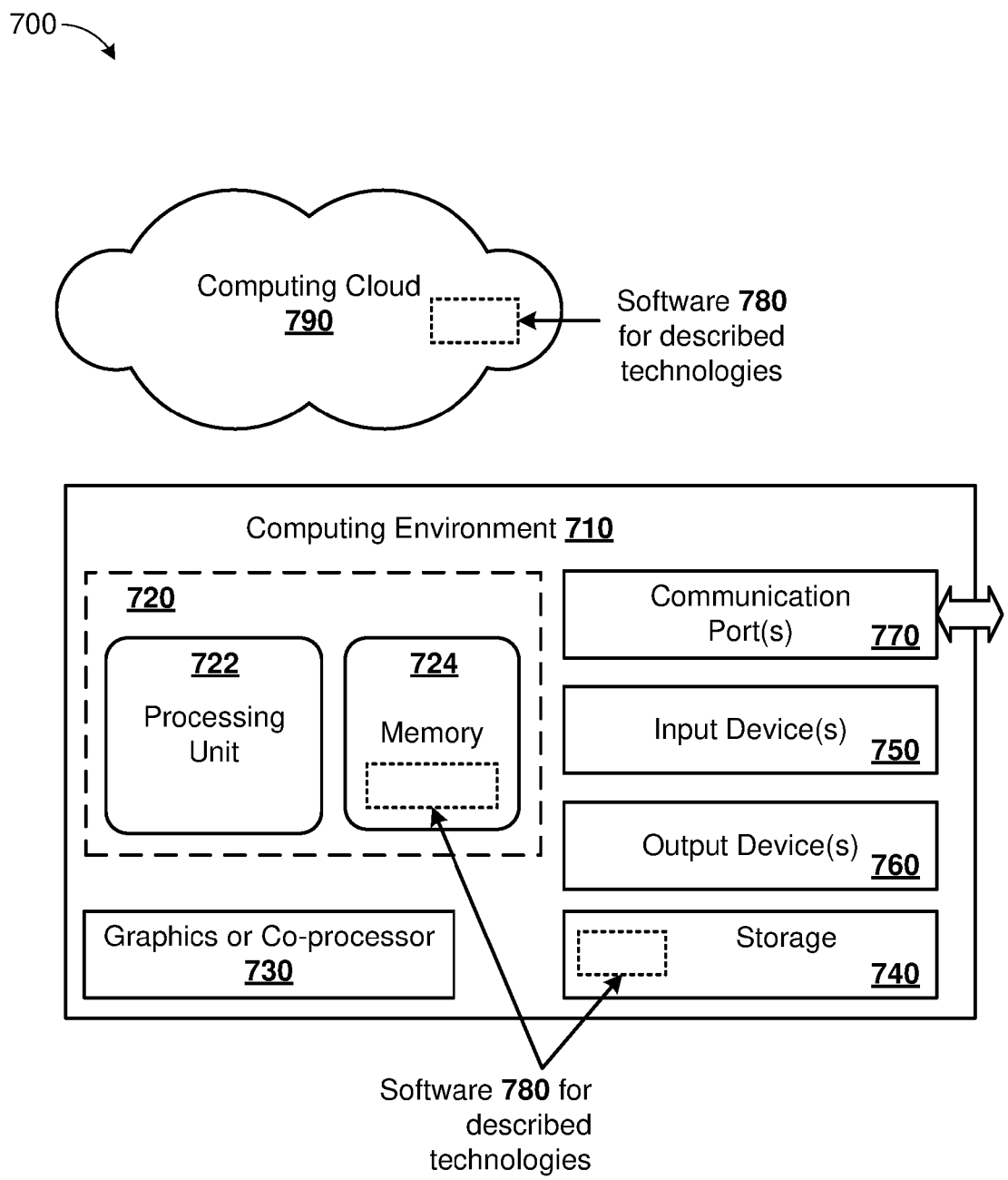
FIG. 7 is a diagram schematically depicting a computing environment suitable for implementation of disclosed technologies.

FIG. 7 illustrates a generalized example of a suitable computing system 700 in which described examples, techniques, and technologies, including calculating sustainability footprints according to disclosed technologies can be implemented. The computing system 700 is not intended to suggest any limitation as to scope of use or functionality of the present disclosure, as the innovations can be implemented in diverse general-purpose or special-purpose computing systems.

With reference to FIG. 7, computing environment 710 includes one or more processing units 722 and memory 724. In FIG. 7, this basic configuration 720 is included within a dashed line. Processing unit 722 executes computer-executable instructions, such as for implementing any of the methods or objects described herein for performing queries on a composite graph data structure representing a dynamic system, or various other architectures, components, handlers, managers, modules, or services described herein. Processing unit 722 can be a general-purpose central processing unit (CPU), a processor in an application-specific integrated circuit (ASIC), or any other type of processor. In a multi-processing system, multiple processing units execute computer-executable instructions to increase processing power. Computing environment 710 can also include a graphics processing unit or co-processing unit 730. Tangible memory 724 can be volatile memory (e.g., registers, cache, or RAM), non-volatile memory (e.g., ROM, EEPROM, or flash memory), or some combination thereof, accessible by processing units 722, 730. The memory 724 stores software 780 implementing one or more innovations described herein, in the form of computer-executable instructions suitable for execution by the processing unit(s) 722, 730. The memory 724 can also store footprint calculation data, a composite graph data structure, including nodes, edges, and their respective attributes; a table or other data structure indicating states of a modeled system, configuration data, UI displays, browser code, data structures including data tables, working tables, change logs, output structures, input fields, output fields, data values, indices, or flags, as well as other operational data.

A computing system 710 can have additional features, such as one or more of storage 740, input devices 750, output devices 760, or communication ports 770. An interconnection mechanism (not shown) such as a bus, controller, or network interconnects the components of the computing environment 710. Typically, operating system software (not shown) provides an operating environment for other software executing in the computing environment 710, and coordinates activities of the components of the computing environment 710.

The tangible storage 740 can be removable or non-removable, and includes magnetic disks, magnetic tapes or cassettes, CD-ROMs, DVDs, or any other medium which can be used to store information in a non-transitory way and which can be accessed within the computing environment 710. The storage 740 stores instructions of the software 780 (including instructions and/or data) implementing one or more innovations described herein.

The input device(s) 750 can be a mechanical, touch-sensing, or proximity-sensing input device such as a keyboard, mouse, pen, touchscreen, trackball, a voice input device, a scanning device, or another device that provides input to the computing environment 710. The output device(s) 760 can be a display, printer, speaker, optical disk writer, or another device that provides output from the computing environment 710.

The communication port(s) 770 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 700 can also include a computing cloud 790 in which instructions implementing all or a portion of the disclosed technology are executed. Any combination of memory 724, storage 740, and computing cloud 790 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 8:
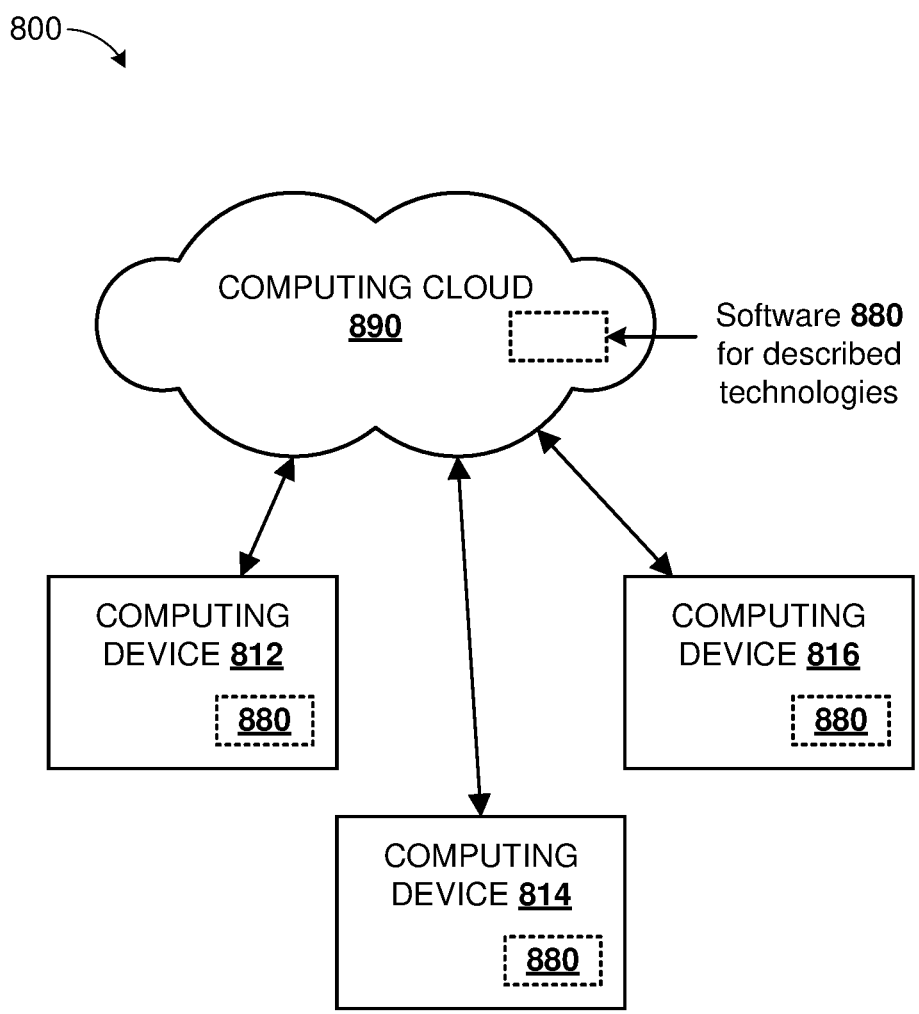
FIG. 8 is a diagram schematically depicting computing devices operating in conjunction with a computing cloud for implementation of disclosed technologies.

FIG. 8 depicts an example cloud computing environment 800 in which the described technologies can be implemented. The cloud computing environment 800 comprises a computing cloud 890 containing resources and providing services. The computing cloud 890 can comprise various types of cloud computing resources, such as computer servers, data storage repositories, networking resources, and so forth. The computing cloud 890 can be centrally located (e.g., provided by a data center of a business or organization) or distributed (e.g., provided by various computing resources located at different locations, such as different data centers and/or located in different cities or countries).

The computing cloud 890 can be operatively connected to various types of computing devices (e.g., client computing devices), such as computing devices 812, 814, and 816, and can provide a range of computing services thereto. One or more of computing devices 812, 814, and 816 can be computers (e.g., servers, virtual machines, embedded systems, desktop, or laptop computers), mobile devices (e.g., tablet computers, smartphones, or wearable appliances), or other types of computing devices. Communication links between computing cloud 890 and computing devices 812, 814, and 816 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 812, 814, and 816 can also be connected to each other.

Computing devices 812, 814, and 816 can utilize the computing cloud 890 to obtain computing services and perform computing operations (e.g., data processing, data storage, and the like). Particularly, software 880 for performing the described innovative technologies can be resident or executed in the computing cloud 890, in computing devices 812, 814, and 816, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 6, computer-readable storage media include memory 624, and storage 640. The term computer-readable storage media does not include signals and carrier waves. In addition, the term computer-readable storage media does not include communication ports (e.g., 670) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, C, C++, C#, Curl, Dart, Fortran, Go, Java, JavaScript, *Julia*, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable storage media storing instructions which, when executed by one or more hardware processors, cause the hardware processors to perform actions comprising:
   receiving a selection of a data object comprising table relationships for a plurality of database tables belonging to a computer application;
   retrieving a first set of table links from the data object;
   generating an enhanced set of table links by appending additional table links to the first set based on one or more linkages within the database tables and based on a first code extension or add-in;
   extracting and matching metadata of tables in the enhanced set of table links to determine a first set of field links for the data object;
   generating an enhanced set of field links by performing additions, deletions, or replacements within the first set of field links based on one or more characteristics of the field links in the first set and based on a second code extension or add-in;
   generating a model for the data object representing the enhanced set of table links and the enhanced set of field links, wherein the enhanced field links are associated with respective link types, and wherein the model includes an indication of the link types of each field link in the enhanced field links;
   populating a database for an information retrieval framework with the generated model, the database storing a plurality of models for a plurality of data objects, each model of the plurality of models defining a boundary for a respective associated data object of the plurality of data objects; and
   determining a presence of common links across models in the database, wherein, responsive to determining the presence of common links across models in the database having different link types, the common links are processed to generate the enhanced set of field links in an order based on the link types.

2. The one or more computer-readable storage media of claim 1, wherein the data object is an information lifecycle management object corresponding to an archiving object or a destruction object associated with the database.

3. The one or more computer-readable storage media of claim 1, wherein the enhanced set of table links is further generated by removing links to redundant or irrelevant tables added by the appending of the additional table links.

4. The one or more computer-readable storage media of claim 1, wherein generating the enhanced set of field links comprises joining fields having a same name or type.

5. The one or more computer-readable storage media of claim 1, wherein the link types are one of a functional model, a final, a constant, or a reference field link type.

6. The one or more computer-readable storage media of claim 5, wherein the order comprises processing functional model link types before processing final link types, processing final link types before constant link types, and processing constant link types before reference link types.

7. The one or more computer-readable storage media of claim 1, wherein the model is represented as a data structure, the data structure comprising indicators for linked tables, indicators for linked fields, and link types for the linked fields.

8. The one or more computer-readable storage media of claim 1, wherein the instructions are further executable to generate the model as a simulation before populating the database with the model.

9. The one or more computer-readable storage media of claim 1, wherein the database includes personal data for a data subject and wherein the information retrieval framework is configured to generate reports of the personal data for the data subject responsive to a request.

10. A method performed by a computer, the method comprising:
   receiving, via user input to a user interface, a selection of a data object comprising table links for a plurality of database tables belonging to a computer application;
   extracting linkages within the database tables for the data object and generating an enhanced set of table links by appending additional table links to the table links of the data object based on the extracted linkages;
   extracting and matching metadata of tables in the enhanced set of table links to determine a first set of field links for the data object;
   generating an enhanced set of field links by adjusting field links in the first set of field links based on characteristics of the field links in the first set;
   generating a model for the data object representing the enhanced set of table links and the enhanced set of field links, wherein the enhanced field links are associated with respective link types, and wherein the model includes an indication of the link types of each field link in the enhanced field links;

outputting a representation of the generated model to the user interface;

populating a database for an information retrieval framework with the generated model, the database storing a plurality of models for a plurality of data objects, each model of the plurality of models defining a boundary for a respective associated data object of the plurality of data objects by breaking out a shared table into individual tables replicated for each data object of the plurality of data objects that corresponds to the shared table and establishing the boundary for the respective associated data object around tables corresponding to the respective associated data object; and determining a presence of common links across models in the database, wherein, responsive to determining the presence of common links across models in the database having different link types, the common links are processed to generate the enhanced set of field links in an order based on the link types.

11. The method of claim 10, wherein outputting the representation of the generated model to the user interface comprises outputting code including indicators for linked tables, indicators for linked fields, and link types for the linked fields of the generated model.

12. The method of claim 10, wherein the database is a database for an information retrieval framework.

13. The method of claim 12, further comprising receiving a request to retrieve personal data corresponding to a data subject, and retrieving the personal data from the database using the information retrieval framework.

14. The method of claim 10, wherein the linkages within the tables of the database comprise foreign key relationships, wherein entries in a first table of the database are internally linked to a second table of the database.

15. The method of claim 10, wherein adjusting field links in the first set of field links based on characteristics of the field links in the first set comprises joining fields having a same name or type.

16. The method of claim 10, wherein adjusting field links in the first set of field links based on characteristics of the field links in the first set comprises accepting manual additions, deletions, or replacements of field links via the user interface.

17. A system, comprising:

one or more hardware processors with memory coupled thereto;

computer-readable media storing instructions executable by the one or more hardware processors, the instructions comprising:

first instructions to receive a request for personal data associated with a data subject; and second instructions to locate the personal data in a database of an information retrieval framework and output a report indicating the personal data, wherein the database stores a plurality of models for a plurality of data objects, each model of the plurality of models defining a boundary for a respective associated data object of the plurality of data objects by breaking out a shared table into individual tables replicated for each data object of the plurality of data objects that corresponds to the shared table and establishing the boundary for the respective associated data object around tables corresponding to the respective associated data object, and wherein each model of the plurality of models is generated for the respective data object of the plurality of data objects by:

extracting linkages within the database tables for the data object and generating an enhanced set of table links by appending additional table links to the table links of the data object based on the extracted linkages, extracting and matching metadata of tables in the enhanced set of table links to determine a first set of field links for the data object, generating an enhanced set of field links by adjusting field links in the first set of field links based on characteristics of the field links in the first set, generating the model for the data object representing the enhanced set of table links and the enhanced set of field links, wherein the enhanced set of field links are associated with respective link types, and wherein the model includes an indication of the link types of each field link in the enhanced set of field links, and determining a presence of common links across models in the database, wherein, responsive to determining the presence of common links across models in the database having different link types, the common links are processed to generate the enhanced set of field links in an order based on the link types.

18. The system of claim 17, wherein the model is represented as a data structure, the data structure comprising indicators for linked tables, indicators for linked fields, and link types for the linked fields for the model.

* * * * *